United States Patent [19]

Campanini

[11] Patent Number: 4,700,292

[45] Date of Patent: Oct. 13, 1987

[54] INTERFACE CIRCUIT ARRANGEMENT FOR TRANSFERRING DATA FROM A MASTER PROCESSOR TO A SLAVE PROCESSOR

[75] Inventor: Giorgio Campanini, Bareggio, Italy

[73] Assignee: Italtel Societa Italiana Telecomunicazioni SpA, Milan, Italy

[21] Appl. No.: 458,252

[22] Filed: Jan. 17, 1983

[30] Foreign Application Priority Data

Jan. 19, 1982 [IT] Italy ............................ 19173 A/82

[51] Int. Cl.[4] .................... G06F 15/16; G06F 11/16; G06F 12/00
[52] U.S. Cl. ..................................... 364/200; 371/9; 364/132; 364/187
[58] Field of Search ... 364/132, 138, 187, 200 MS File, 364/900 MS File; 360/39, 40, 48, 49; 371/9, 49

[56] References Cited

U.S. PATENT DOCUMENTS

| | | | |
|---|---|---|---|
| 4,030,074 | 6/1977 | Giorcelli | 364/200 |
| 4,208,650 | 6/1980 | Horn | 371/49 |
| 4,298,928 | 11/1981 | Etoh et al. | 364/200 |
| 4,326,291 | 4/1982 | Marsh et al. | 371/49 |
| 4,351,023 | 9/1982 | Richer | 371/9 X |
| 4,368,514 | 1/1983 | Persand et al. | 364/200 |
| 4,369,443 | 1/1983 | Giallanza et al. | 340/825.44 |
| 4,424,565 | 1/1984 | Larson | 364/200 |
| 4,456,933 | 6/1984 | Schneider et al. | 360/40 |
| 4,466,098 | 8/1984 | Southard | 371/9 |
| 4,471,427 | 9/1984 | Harris | 364/200 |
| 4,481,578 | 11/1984 | Hughes et al. | 364/200 |

*Primary Examiner*—Archie E. Williams, Jr.
*Assistant Examiner*—Thomas C. Lee
*Attorney, Agent, or Firm*—Karl F. Ross; Herbert Dubno

[57] ABSTRACT

Two identical processors of a communication system, operating in master-slave relationship, each have a mass memory, a working memory, a CPU and an interface interlinked by an internal bus, the two interfaces being interconnected by an interprocessor bus serving for the exchange of data therebetween. When the mass memory of the slave process or needs updating, data words to be transferred from the mass memory of the master processor are fed via the interprocessor bus and a buffer store of the slave processor to the working memory thereof from which they are subsequently delivered to the associated mass memory while the CPU of the master processor performs other operations. A block of data words thus transferred is preceded by a header, emitted by the master CPU, which sets a word counter in the associated interface whose progressive decrementation determines the end of the transfer operation. Outgoing words are supplemented in the master interface with redundancy bits enabling correction of possible errors upon their arrival at the slave interface.

20 Claims, 5 Drawing Figures

INTERFACE CIRCUIT ARRANGEMENT FOR TRANSFERRING DATA FROM A MASTER PROCESSOR TO A SLAVE PROCESSOR

FIELD OF THE INVENTION

My present invention relates to a data-handling system, e.g. as used in telecommunication, wherein two substantially identical processors operate in an interchangeable master-slave relationship.

BACKGROUND OF THE INVENTION

Such a pair of processors (which may also be termed computers) is known per se, for example, from U.S. Pat. Nos. 4,030,074, and 3,786,433. Reference in this connection may further be made to my copending application Ser. No. 452,202 filed on Dec. 22, 1982, now U.S. Pat. No. 4,654,784, according to which two interconnected support processors alternatively control a plurality of switching modules each including a pair of central processing units or CPUs likewise mated in a master-slave relationship.

In many instances, such a processor includes—besides its CPU—two distinct types of memory, namely a so-called mass memory of the nonvolatile kind and an entirely electronic, usually volatile working memory for the temporary storage of data and instructions to be used in controlling the operation of associated peripheral units. When the processor designated as the master malfunctions, that role is assigned to its twin while diagnostic operations are being carried out to trace and correct the defect. After corrections have been made, the erstwhile master is relegated to the role of standby or slave in order to be available if the current master should fail. For this purpose it is, of course, necessary that the contents of the mass memory of the newly designated slave processor be updated so that its contents are identical with those of the other mass memory in order that the two component can operate in synchronism. Though the contents of the originating mass memory are left intact, thanks to their nondestructive readout this procedure will be referred to hereinafter as a transfer.

When the slave processor has been out of service for an extended period, the transfer of a large number of data words—e.g. several tens of megabytes—from the mass memory of the master by conventional means may be quite time-consuming and can possibly last for several hours during which the operation of the master processor is inhibited. The transfer time could be shortened by the technique of direct memory access (DMA) which, however, cannot be utilized for direct communication between the two mass memories on account of synchronization problems. Thus, prior-art DMA data transfers between the mass memories of mated processors had to proceed through three distinct phases, namely a first phase of transfer from the mass memory of the master processor to its own working memory, a second phase of transfer from the working memory of this processor so that of its twin, and a third phase of transfer from the latter memory to the mass memory of the slave processor. With the first two transfers occurring under the control of the master CPU, its operating program had to undergo a prolonged interruption.

Such program interruptions are, of course, acceptable for short intervals, as where only a few data words are to be transferred from time to time in the course of normal operations. There are also instances in which data words are to be transferred directly from the working memory, rather than from the mass memory, of the master processor to that of its twin.

OBJECTS OF THE INVENTION

An important object of my present invention is to provide a circuit arrangement enabling a more expeditious data transfer from the mass memory of one processor to that of the other, especially when a large number of data words are involved, so as to minimize the interruption of the normal operating program of the master.

It is also an object of my invention to provide means in such a circuit arrangement for the selective utilization of several different modes of transfer, including DMA transfer from the mass memory of the master, DMA transfer from its working memory and transfer with extended program interruption.

SUMMARY OF THE INVENTION

In accordance with my present invention, I provide the two mated processors with respective interfaces communicating with each other through a bidirectional interprocessor bus, each interface having input/output means communicating via an internal bus of the respective processor with the CPU, the mass memory and the working memory thereof. Each interface further comprises register means connected to the input/output means for storing information received from the associated CPU, when its processor is designated as the master, in regard to data to be transferred from the corresponding mass memory to that of the other (slave) processor. This information, which is part of a header preceding the actual readout from the mass memory, includes the number of data words involved in the transfer as well as instructions to be sent to the interface of the processor for indentifying memory locations that are destined to receive the transferred data words. The interface also comprises circuit means, referred to hereinafter as DMA circuitry, responsive to the stored information for extracting data words via the input/output means from the internal bus of the respective processor, operating as the master, and for transmitting the aforementioned instructions as well as the extracted data words to the interface of the slave processor by way of the interprocessor bus. A buffer store in each interface is enabled, upon the designation of the respective processor as the slave, to receive data words transmitted by the DMA circuitry of the interface of the master processor and to forward these data words via the internal bus of the slave processor to its working memory for subsequent retransmission to the associated mass memory under the control of the location-identifying instructions that are received from the register means of the master processor and stored in the register means of the interface of the slave processor. Since the slave processor does not carry out a program of its own, this retransmission does not interfere with its operation.

Included in the register means of each interface, pursuant to a more particular feature of my invention, is an address register loadable by the CPU of the respective processor with an initial address of the associated working memory to which a first data word in a series of such words is to be read out from the associated mass memory. The interface, in that instance, further includes comparison means with inputs connected to the address register and to the input/output means of the interface for delivering to the DMA circuitry an unblocking signal enabling the transfer of an incoming data word to the interprocessor bus in response to detection of a match between the contents of the address register and a memory address concurrently emitted by the associated CPU on the internal bus when the processor operates as a master. A connection between the DMA circuitry and the address register serves to increment the contents of that register, in response to such an unblocking signal, so that the next word in the series (immediately preceded by the address of an adjoining working-memory location) can be similarly read out. The working memory of the master, some of whose cells are consecutively addressed in this manner by the associated CPU, also receives the data words read out from the associated mass memory but does not actively participate in the transfer of these words to the interface of the slave processor so that the above-mentioned first phase of the prior-art transfer procedure is eliminated. The master CPU can therefore resume normal operation as soon as the readout of a given series of such data words is terminated though the transferred words, delivered by the interface of the slave processor through its buffer store to the associated working memory, are yet to be or in the process of being retransmitted from that memory to the mass memory of the latter processor. Such retransmission, even if it should last for an extended period, therefore does not prevent the execution of the operating program of the master processor.

The register means of each interface may further include, in accordance with another feature of my invention, a word counter which is loadable by the CPU of the master processor (directly or through the interprocessor bus) with a numerical value forming part of the header and representing the number of data words in a series to be read out. The DMA circuitry of the interface is connected to this word counter for decrementing the stored numerical value upon the transfer of each data word (e.g. in response to the unblocking signal emitted by the associated address register in the case of the master processor) so that the counter will be empty when the readout is completed. A zero-content signal then generated by the word counter inhibits further transfer of data words between the two interfaces.

In accordance with yet another feature of my invention, the DMA circuitry of each interface comprises a first and a second preprogrammed sequencer controlling respective read-only memories. When the master CPU emits a transfer instruction to the associated interface, the first read-only memory thereof initiates a dialogue with the other interface which after receiving the header sends back a readiness signal causing the second read-only memory to command the transfer of incoming data words to the slave processor. The first sequencer may be activated by enabling means, including an additional read-only memory, in response to an initial instruction from the associated CPU, the latter memory being addressed by decoding means receiving this initial instructions as well as the rest of the header for relaying same in suitably modified form to the associated register means, specifically to a command register connected to this memory.

A still further feature of my invention, designed to facilitate the early detection and elimination of any transmission errors in instruction or data words exchanged between the two interfaces, resides in the insertion of a correction-code generator in an outgoing signal path of each interface and of a corresponding code corrector in an incoming signal path thereof. The correction-code generator operates, in a manner well known per se, to supplement an outgoing word with a sufficient number of redundancy bits to enable the recognition and, if necessary, the rectification of an error by the code corrector of the receiving interface to prevent malfunctions.

BRIEF DESCRIPTION OF THE DRAWING

The above and other features of my invention will now be described in detail with reference to the accompanying drawing in which.

DESCRIPTION OF THE PREFERRED EMBODIMENT

Figure 1:
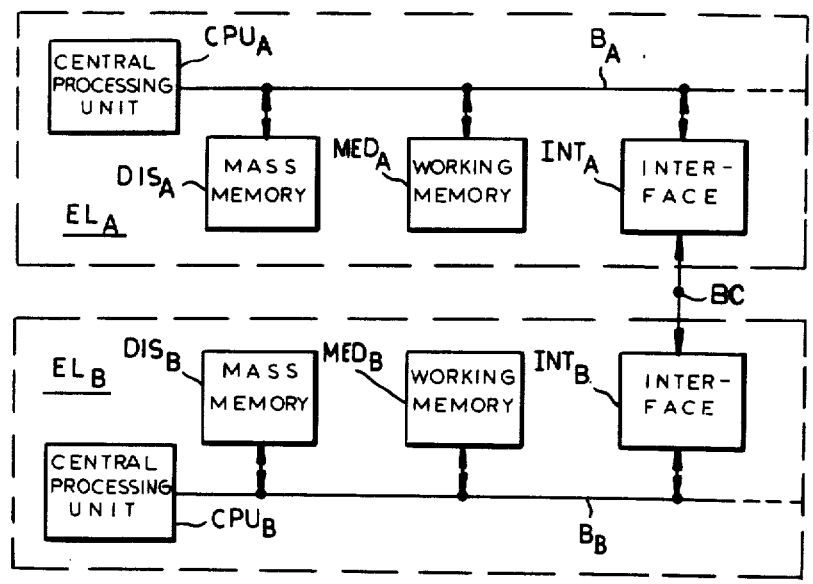
FIG. 1 is a block diagram of a pair of mated processors embodying my invention.

FIG. 1 shows a pair of substantially identical processors $EL_A$ and $EL_B$ operating in an interchangeable master-slave relationship as discussed above. Only the components of these processors essential for an understanding of my invention have been illustrated, to the exclusion of conventional circuitry handling communication with associated peripheral units and possibly with another processor of higher rank. The components are a central processing unit $CPU_A$, $CPU_B$, a mass memory $DIS_A$, $DIS_B$, a working or data memory $MED_A$, $MED_B$ and an interface $INT_A$, $INT_B$. The components of each processor are linked to one another by an internal bus $B_A$, $B_B$ while their two interfaces $INT_A$, $INT_B$ communicate with each other via an interprocessor bus BC. Also not illustrated is a clock controlling the operation of the several components of both processors.

The two mass memories $DIS_A$, $DIS_B$ may be essentially constituted by a variety of recording media such as disks or tapes, for example. In the case of a disk, as particularly assumed hereinafter, the locations of storage areas for data words to be written in or read out can be defined in the usual manner in terms of sector numbers and track numbers.

Figure 2:
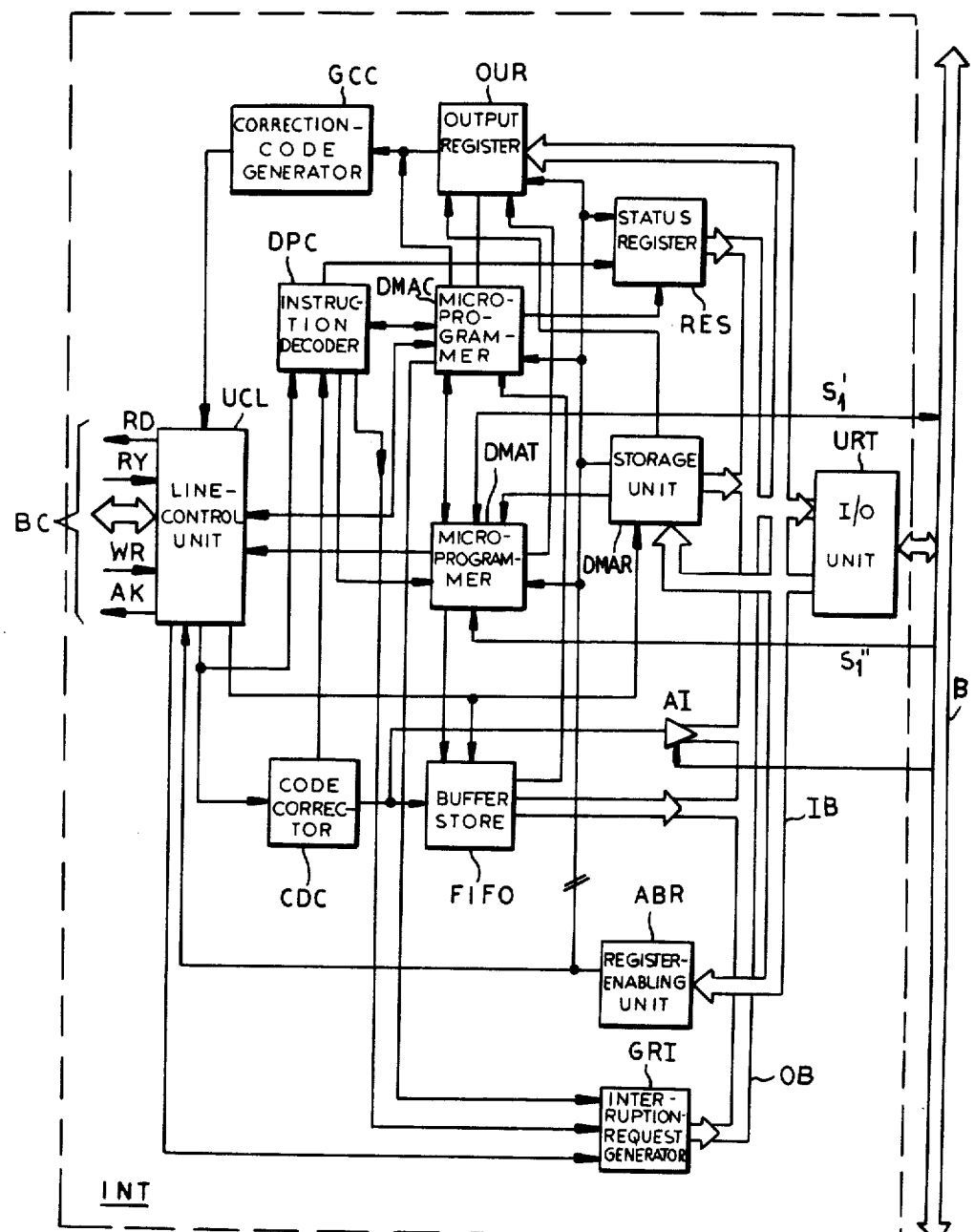
FIG. 2 is a more detailed diagram of an interface included in each of the processors of FIG. 1.

FIG. 2 shows an interface INT which is representative of either of the two interfaces $INT_A$ and $INT_B$ of FIG. 1. The interface comprises an input/output unit URT in bidirectional communication with the internal bus B of the respective processor, this unit being further connected within the interface to an input bus IB and an output bus OB. Input bus IB extends to a register-enabling unit ABR, an output register OUR and a storage unit DMAR whereas output bus OB receives signals from unit DMAR, from a status register RES, from an interruption-request generator GRI and from a buffer store FIFO of the first-in/first-out type. Buffer store FIFO is connected to the output of a code corrector CDC which also works directly into bus OB through a normally closed electronic gate AI. A line-control unit UCL connects the interprocessor bus BC to an incoming path terminating at code corrector CDC and to an outgoing path extending from register OUR by way of a correction-code generator GCC which supplies emitted code words with redundancy bits detectable by the code corrector CDC of the interface of the companion processor. Other components of interface INT are a first and a second microprogrammer DMAC and DMAT, forming part of the aforementioned DMA circuitry, as well as an instruction DPC which dialogues with microprogrammer DMAC and has an input connected to the main output of unit UCL. Decoder DPC includes a comparator, not separately illustrated, with inputs respectively connected to code corrector CDC and microprogrammer DMAC; other output leads of this decoder extend to interruption-request generator GRI, to status register RES and to microprogrammer DMAT. Request generator GRI is further connected to outputs of control unit UCL and microprogrammer DMAC. Commands issuing from enabling unit ABR can reach components UCL, DMAC, DMAT, DMAR, RES and OUR.

Further connections shown in FIG. 2 will be discussed in the ensuring description of subsequent Figures in which lower-case letters are used to indicate respective components (identified by corresponding capital letters) at which certain leads originate or terminate.

Figure 3:
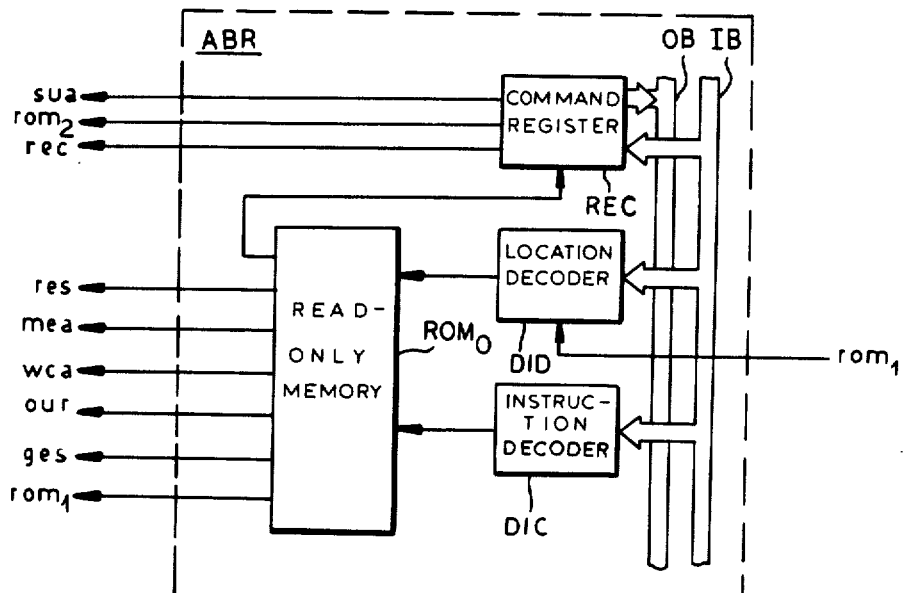
FIG. 3 shows details of a register-enabling unit forming part of the interface of FIG. 2.
Figure 4:
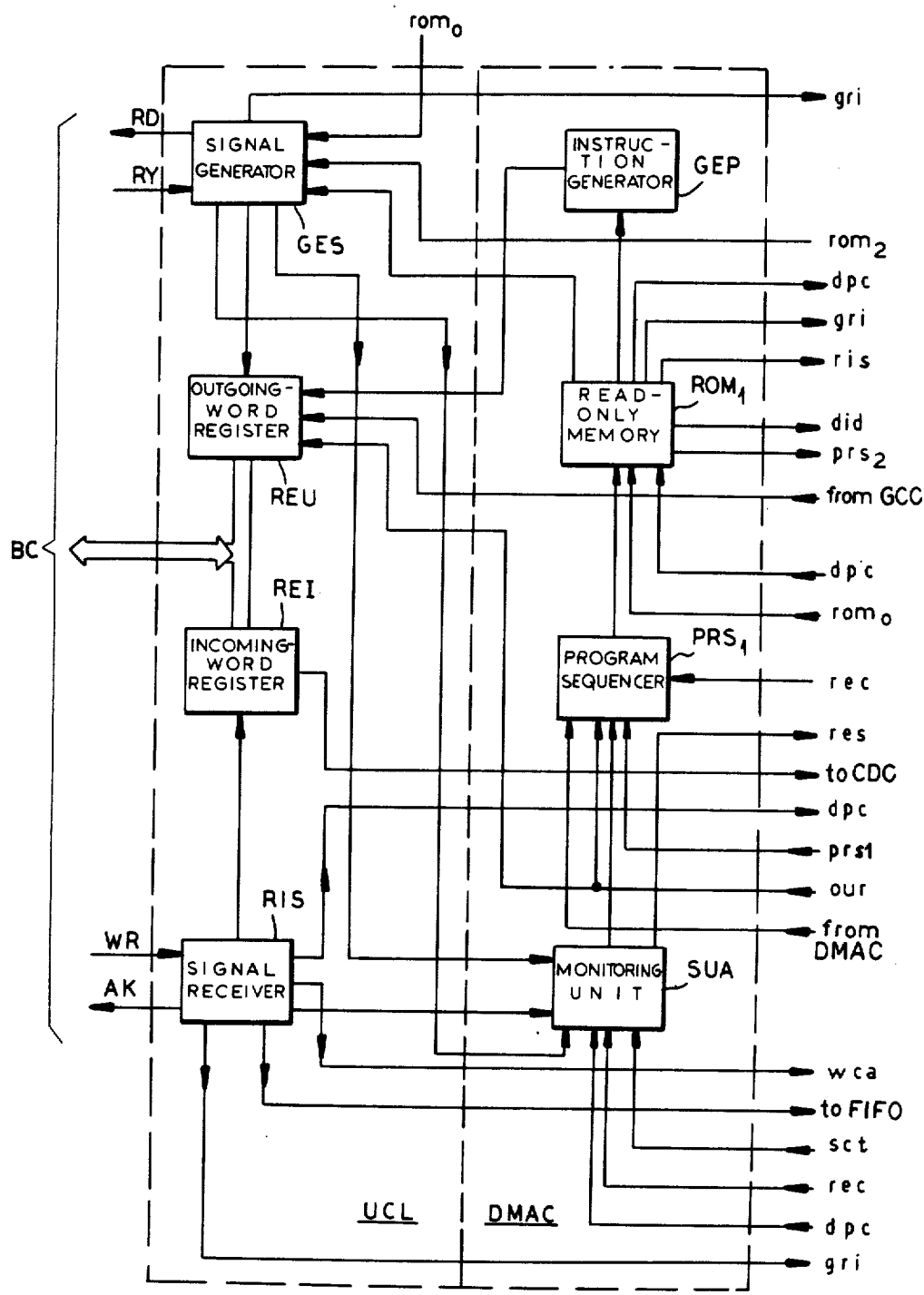
FIG. 4 shows details of a line-control unit and of a first microprogrammer included in that interface.

Details of enabling unit ABR are shown in FIG. 3. The constituents of that unit include an instruction decoder DIC and a location decoder DIDI inserted between input bus IB and respective address inputs of a read-only memory $ROM_0$. Also included in unit ABR is a command register REC, connected to a data output of memory $ROM_0$ and communicating with both buses IB, OB, from which an outgoing lead labeled $prs_1$ extends to a program sequencer $PRS_1$ forming part of micropro- grammer DMAC as shown in FIG. 4. This sequencer, which has another input connected by an incoming lead labeled fifo to an output of buffer store FIFO (FIG. 2), controls a read-only memory $ROM_1$ also having inputs directly connected to decoder DPC (FIG. 2) and to memory $ROM_0$ (FIG. 3). Further elements of component DMAC are a monitoring unit SUA, working into sequencer $PRS_1$ and status register RES (FIG. 2), as well as an instruction generator GEP controlled by memory $ROM_1$; this generator has an output lead, labeled gcc, extending in parallel with that of register OUR, FIG. 2, to correction-code generator GCC.

Also shown in FIG. 4 are the constituents of line-control unit UCL which include a signal generator GES with inputs connected to memories $ROM_0$ and $ROM_1$, an outgoing-word register REU with an output connected to the main bidirectional channel of interprocessor bus BC, an incoming-word register REI with an input connected to the same channel, and a signal receiver RIS which essentially consists of a read-only memory with outputs tied to components GRI, CDC and DPC of FIG. 2 as well as to components REI and SUA of FIG. 4. Register REU has a data input connected to code generator GCC while register REI has a data output terminating at code corrector CDC; these two connections, therefore, constitute in essence the incoming and outgoing signal paths referred to in the description of FIG. 2.

Figure 5:
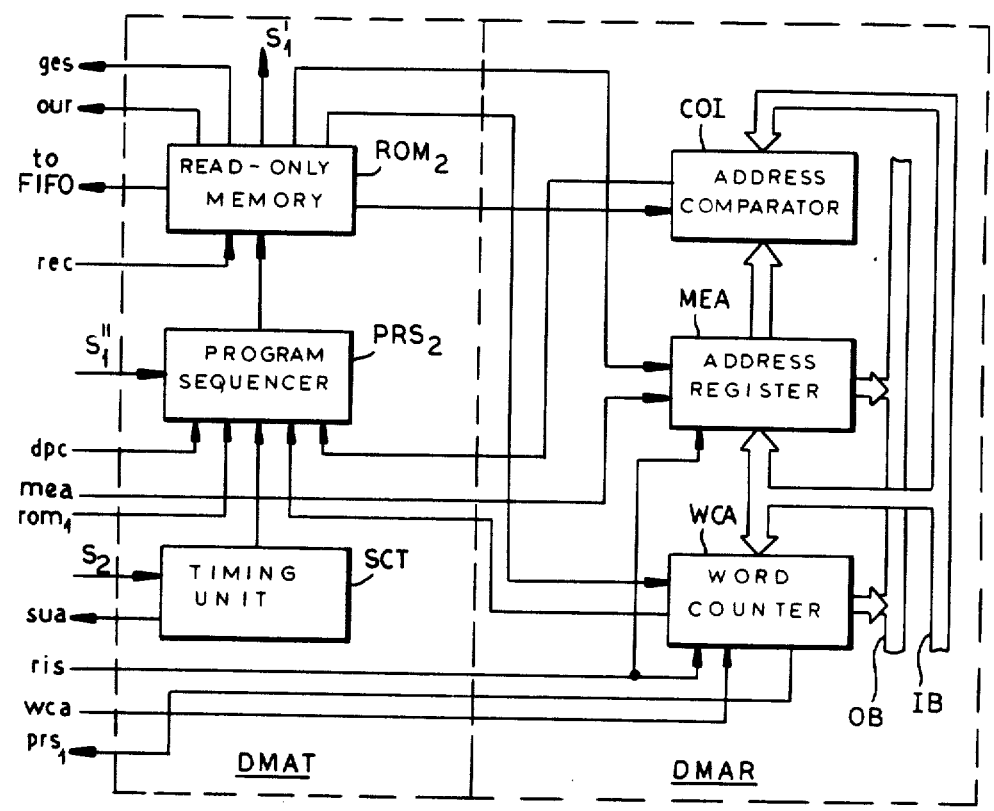
FIG. 5 shows details of a second microprogrammer and of a storage unit also included in the interface.

As shown in FIG. 5, storage unit DMR includes a word counter WCA, an address register MEA and an address comparator COI all having inputs connected to bus IB; counter WCA has an output tied to bus OB while register MEA works into the same bus as well as into another input of comparator COI. Microprogrammer DMAT is seen to include a second program sequencer $PRS_2$, an associated read-only memory $ROM_2$ and a timing unit SCT, the latter working into sequencer $PRS_2$ and into the monitoring unit SUA of FIG. 4. Further inputs of sequencer $PRS_2$ are connected to outputs of components DPC, $ROM_1$, WCA and COI. Memory $ROM_2$ has output leads extending to register OUR and signal generator GES as indicated by their labels our and ges.

OPERATION

When the interface INT of FIG. 2 is part of the master processor, assumed to be the one designated $EL_A$ in FIG. 1, the procedure for updating the mass memory $DIS_B$ of the slave processor $EL_B$ is initiated by the emission of a message from unit $CPU_A$ which is detected by the enabling unit ABR (FIG. 3) and constitutes the header referred to above. This header includes an initial binary configuration which is recognized by decoder DIC and causes the activation of memory $ROM_1$ of microprogrammer DMAC (FIG. 4) by way of a correspondingly labeled output connection from memory $ROM_0$. The next part of the header is another binary configuration which, via decoder DIC and memory $ROM_0$, sets one of several flip-flops of command register REC to send a signal to sequencer $PRS_1$ of component DMAC selecting that part of its stored program which pertains to the type of operation to be performed, namely the disk-to-disk DMA transfer of outgoing data words in the present instance. Memory $ROM_0$, in responding to this binary configuration, also sets a flip-flop in status register RES (FIG. 2) to a position indicating the commencement of such a transfer operation.

Under the control of sequencer $PRS_1$, memory $ROM_1$ triggers the instruction generator GEP into the emission of a start-of-procedure word which is fed to correction-code generator GCC (FIG. 2) for supplementation with redundancy bits and is then forwarded to register REU of unit UCL (FIG. 4) for subsequent delivery to the other interface—i.e. the one designated $INT_B$ in FIG. 1—by way of the interprocessor bus BC. The output of register REU, however, is blocked at this time while memory $ROM_1$ energizes the signal generator GES of unit UCL to send to the slave interface a data-ready signal RD eliciting the emission of a readiness signal RY from that interface when the latter is in condition to perform a reading operation. Generator GES thereupon unblocks the outgoing-word register REU to emit the start-of-procedure word stored therein; after that word has been properly processed at the slave interface $INT_B$, a writing command WR arrives at the signal receiver RIS of the master interface $INT_A$ which thereupon transmits an acknowledgment signal AK to the slave interface and activates its own register REI for reception of an incoming word confirming the readiness of the slave processor $EL_B$ to accept the instructions corresponding the next part of the header generated by unit $CPU_A$. Signal receiver RIS further activates the instruction decoder DPC (FIG. 2) to which the expected confirmation word is delivered by register REI via code corrector CDC; it also triggers the request generator GRI to let unit $CPU_a$ interrupt its program and check to status register RES. Decoder DPC then compares the received confirmation word with a reference code simultaneously supplied to it by memory $ROM_1$ (FIG. 4) in response to a program-advancing instruction delivered by unit $CPU_A$ to component ABR.

If the result of this comparison is negative, indicating a malfunction, decoder DPC sets a corresponding flip-flop in status register RES and triggers the interruption-request generator GRI into alerting the unit CPU$_A$ which notes the defect upon examining anew the register RES. The transfer operation will then be aborted but could be restarted at a later time.

If decoder DPC ascertains a proper match between the code words received from memory ROM$_1$ and incoming-word register REI, it addresses the memory ROM$_1$ which then triggers the generator GRI into sending another interruption request to unit CPU$_A$. After checking the status register RES, unit CPU$_A$ emits the remainder of the header comprising binary-coded information detected by decoder DID (FIG. 3) which, having been enabled by a signal from memory ROM$_1$, addresses the memory ROM$_0$ in order to read out corresponding data to various components involved. More particularly, that information includes a numerical value which represents the total number of data words to be transferred, this value being loaded into word counter WCA (FIG. 5) and into output register OUR (FIG. 2) from which it is forwarded via code generator GCC and line-control unit UCL to the interface of slave processor EL$_B$. There appears next on bus IB the address of a first cell of working memory MED$_A$ (FIG. 1), acting as the dummy recipient of data words read out from disk memory DIS$_A$, as an identification of the first word in the forthcoming series; this address is delivered to register MEA of unit DMAR (FIG. 5) but is not communicated to the other processor. Instead, unit CPU$_A$ emits an identification of the area of the disk memory DIS$_B$ of slave processor EL$_B$ in which the first data word is to be written; this identification, specifying the sector and track numbers of that area, is also stored in output register OUR preparatorily to its transmission to interface INT$_B$. The transmission of the word so stored in register OUR is preceded, in response to a command fed from memory ROM$_0$ to generator GES, by an exchange of signals RD and RY as described above; these signals, in fact, respectively correspond to signals WR and AK arriving and originating at the receiver RIS of the other interface.

When all this preliminary information has been properly registered in both interfaces, the slave interface INT$_B$ sends back a start-transfer word which under the control of signal receiver RIS, as described above, is delivered from register REI to code corrector CDC and reaches the decoder DPC for comparison with a reference code then appearing in the output of memory ROM$_1$. If the result of the comparison is negative, the transfer operation will be aborted as in the aforedescribed instance. Otherwise, decoder DPC activates the program sequencer PRS$_2$ of component DMAT (FIG. 5) whose memory ROM$_2$ has been enabled by an output signal of command register REC (FIG. 3) under the control of memory ROM$_0$. Sequencer PRS$_2$ thereupon causes the memory ROM$_2$ to activate the address comparator COI of unit DMAR and to make the output register OUR of FIG. 2 receptive to outgoing data words received via input bus IB; signal generator GES is also activated by memory ROM$_2$ to intervene in the aforedescribed manner in the transmission of the contents of register OUR.

In response to an interruption request from generator GRI, triggered as before by signal receiver RIS in the presence of a writing command WR immediately preceding the arrival of the start-transfer word via bus BC, unit CPU$_A$ has again read the status register RES whose contents have been updated by memory ROM$_0$ of enabling unit ABR (FIG. 3). Thus, unit CPU$_A$ will now emit the memory address pertaining to the first word of the series to be read out from disk memory DIS$_A$, that address corresponding to the one stored in register MEA (FIG. 5). In response to this identity, comparator COI steps the sequencer PRS$_2$ of microprogrammer DMAT whose memory ROM$_2$ thereupon enables output register OUR and signal generator GES to transfer the immediately following data word, read our from disk memory DIS$_A$, to interface INT$_B$ by way of register REU and bus BC according to the modalities already described. Memory ROM$_2$ also increments the contents of address register MEA and decrements the value registered in word counter WCA preparatorily to the appearance of the next memory address on bus IB; the data word associated with the latter address is then transmitted in the same way to the other interface, and so on until the reading of word counter WCA is zero. The emptied word counter then energizes the sequencer PRS$_1$ of microprogrammer DMAC (FIG. 4) which causes memory ROM$_1$ to deactivate the sequencer PRS$_2$ of microprogrammer DMAT so as to inhibit further data-word transfers.

At the interface of slave processor EL$_B$, where a similar countdown has taken place, an end-of-reception word is then emitted and is received in interface INT$_A$ by register REI of unit UCL (FIG. 4) which delivers it, in the manner already described, to decoder DPC for comparison with a corresponding reference word then appearing in the output of memory ROM$_1$. Under normal circumstances, this comparison has again a positive outcome and results in the emission of an end-of-procedure word by the memory ROM$_1$ addressed by decoder DPC. Memory ROM$_1$ also updates the contents of status register RES and triggers the request generator GRI so that unit CPU$_A$ can ascertain the termination of the transfer operation.

Let us now consider the situation in which the interface INT of FIG. 2 is part of the slave processor EL$_B$ (FIG. 1) and receives the data words read our from disk memory DIS$_A$ of master processor EL$_A$. After the initial exchange of signals RD/WR and RY/AK between the two line-control units UCL, the start-of-procedure word arriving via bus BC at register REI (FIG. 4) is delivered to decoder DPC which in response thereto sets a flip-flop in status register RES and also sends an interruption request via generator GRI to unit CPU$_B$. The latter, after scanning the register RES, generates the readiness-confirmation word already referred to which on the one hand is transmitted to interface INT$_A$ of the master processor and on the other hand is detected by decoder DIC (FIG. 3) of the interface INT$_B$ here considered to initiate proceedings similar to those at the master interface. Unit CPU$_B$ also causes the loading of register MEA of the associated storage unit DMAR (FIG. 5) with the address of the cell of working memory MED$_B$ available to receive the first data word transferred from the master processor; that cell is presumed to correspond to the cell of memory MED$_A$ which is addressed by unit CPU$_A$ during the readout of this first word from disk memory DIS$_A$. A code representing the number of data words to be transferred, transmitted from interface INT$_A$ as described above, arrives via register REI at code corrector CDC and, after passing the gate AI which is opened at this stage by an unblocking signal from unit CPU$_B$, is entered in word counter WCA (FIG. 5) by way of buses OB and IB. The binary code identifying (in terms of sector and track numbers) the first storage location of the disk memory DIS$_B$ to be updated, generated by unit CPU$_A$ as heretofore described, is similarly passed through code corrector CDC and gate AI but, with word counter WCA made nonreceptive at this point by a signal from memory ROM$_0$, proceeds on internal bus B to unit CPU$_B$ which stores it for subsequent utilization in the essentially conventional retransfer of the arriving data words from working memory MED$_B$ to disk memory DIS$_B$.

When all this is done, instruction generator GEP of microprogrammer DMAC (FIG. 4) is directed by memory ROM$_1$ to emit the start-transfer word which is delivered to the other interface by way of code generator GCC, register REU and bus BC with intervention of signal generator GES as described above with reference to the master interface. With gate AI again blocked, each data word now arriving is loaded into buffer store FIFO under the control of memory ROM$_2$ (FIG. 5) of microprogrammer DMAT whose sequencer PRS$_2$ has meanwhile been activated by memory ROM$_1$ in response to a signal fed to sequencer PRS$_1$ by that buffer store upon the reception of the first data word therein. The incoming data words are entered via I/O unit URT and bus B$_B$ at locations assigned thereto in working memory MED$_B$. These locations are identified by the contents of register MEA read out into bus OB; the arrival of each writing command WR at signal receiver RIS (FIG. 4), which immediately precedes each incoming data word, causes the incrementation of the contents of register MEA and the decrementation of the numerical value stored in word counter WCA substantially concurrently with similar operations in the interface of the master processor. As soon as the word counter has been depleted, the zero signal fed by it to sequencer PRS$_1$ terminates the procedure after the emission of the end-of-reception word to the master interface INT$_A$.

When data transfer is to occur from the working memory MED$_A$ of master processor EL$_A$ rather than from its mass memory DIS$_A$, the aforedescribed procedure is somewhat simplified in that there is no transmission to interface INT$_B$ of a code giving the area of mass memory DIS$_B$ in which the first transferred data word is to be entered. Also, the data words can be read out from memory MED$_A$ more rapidly than from memory DIS$_A$ without direct intervention of unit CPU$_A$. Thus, when memory ROM$_2$ has been enabled after the other interface INT$_B$ has signaled its readiness to receive the announced series of data words, it sends a signal S$_1'$ to the control circuitry of memory MED$_B$ by way of bus B$_B$ (represented in FIG. 2 by bus B) whereupon a data word is read out from the cell identified by the address stored in register MEA (FIG. 5) and is transmitted to bus BC via components OUR, GCC and UCL while a signal S$_1''$ is sent back from bus B$_B$ to sequencer PRS$_2$ to initiate the next transfer step; the two signals S$_1'$ and S$_1''$ have been collectively designated S$_1$ in FIG. 2. With the contents of register MEA progressively incremented and those of word counter WCA progressively decremented, as with the aforedescribed mode of operation, the procedure is terminated when counter WCA has been emptied. Address comparator COI is not utilized in this instance.

When only a small number of data words are to be transferred, the initialization involved in the DMA procedure may be too time-consuming so that the operation is more expeditiously carried out during an interruption of the ongoing CPU program. The suitably preprogrammed master CPU, here unit CPU$_A$, then emits a foreshortened header which instructs the microprogrammer DMAC of the two interfaces to perform this mode of operation. When the slave interface INT$_B$ is ready, outgoing words fed via bus IB into the output register OUR of master interface INT$_A$ are tranmitted in the aforedescribed manner (via code generator GCC and line-control unit UCL) to bus BC for storage in memory MED$_B$ under the control of unit CPU$_B$ operating in synchronism with unit CPU$_A$. When output register OUR is empty, it signals the sequencer PRS$_1$ to let the memory ROM$_1$ trigger the request generator GRI for another program interruption until unit CPU$_A$ indicates that no further words are to be transferred, with deactivation of enabling unit ABR and all other components of both interfaces. At the slave interface INT$_B$, with this mode of operation, the incoming data words are transmitted from code corrector CDC via gate AI, bus OB and I/O unit URT to bus B$_B$; the unblocking of gate AI by unit CPU$_B$ occurs as a result of an interruption request emitted by generator GRI in response to a command from signal receiver RIS.

Timing unit SCT of microprogrammer DMAT is controlled by signals S$_2$ received from the associated CPU via internal bus B as indicated in FIGS. 2 and 5. These signals inform unit SCT of the duration of any operating step in a DMA-type transfer procedure. When such a duration exceeds a predetermined limit, e.g. 80 msecs, this unit stops the program of sequencer PRS$_2$ and also informs the monitoring unit SUA which thereupon sets the status register RES to generate an alarm condition. Unit SUA further commands the sequencer PRS$_1$ to let the memory ROM$_1$ trigger the generator GRI into requesting a program interruption which causes the associated CPU to detect that condition. Thus, units SCT and SUA prevent any unduly long seizure of the internal bus B of the respective processor. Unit SUA also has inputs connected to register REC, decoder DPC, signal receiver RIS and signal generator GES in order to monitor their performance.

With a system according to my invention it has become possible to transfer a large number of data words or bytes in a matter of several tens of seconds instead of the much larger delays heretofore necessary therefor.

I claim:

1. In a data-handling system with two substantially identical processors mated to operate in an interchangeable master-slave relationship, each processor including a mass memory, a working memory and a CPU linked with said memories by an internal bus enabling a transfer of data words between said memories and an exchange of such data words with external units, the combination therewith of respective interfaces in said processors communicating with each other through a bidirectional interprocessor bus, each of said interfaces comprising:

input/output means connected to said internal bus;

register means connected to said input/output means for storing, upon designaton of the respective processor as the master, information received via said internal bus from the CPU thereof in regard to said data words to be transferred from corresponding mass memory to the mass memory of the slave processor, said information including the number of said data words involved in the transfer and further including instructions to be sent to the interface of the other processor identifying memory locations destined to receive the transferred data words, said register means includes:

an address register loaded by the CPU of the respective processor with an initial address of the respective working memory to which a first data word in a series of such data words is to be read out from the respective mass memory, each interface further including comparison means with inputs connected to said address register and to said input/output means for delivering to circuit means an unblocking signal enabling the transfer of an incoming data word to said interprocessor bus in response to detection of a match between the contents of said address register and a memory address concurrently emitted by the respective CPU on the internal bus of the respective processor upon designation thereof as the master, said circuit means being connected to said address register for incrementing the contents thereof in response to said unblocking signal;

said circuit means coupled to said register means to detect the stored information for extracting data words from said input/output means and for transmitting said instructions, said information, and said extracted data words to the interface of the slave processor by way of said interprocessor bus; and a buffer store enabled, upon designation of the respective processor as the slave, to receive data words transmitted by said circuit means of the interface of the master processor and to forward the received data words via the internal bus of the slave processor to the working memory thereof for subsequent retransmission to the respective mass memory under the control of the location-identifying instructions received from the register means of the master processor and stored in the register means of the interface of the slave processor.

2. The combinations defined in claim 1 wherein said register means further includes a word counter coupled to said input/output means for receiving from the master processor a numerical value representing the number of data words in a series to be read out, said circuit means being connected to said word counter further comprising a means for decrementing said numerical value upon the transfer of each data word and being able to detect a zero content signal from said word counter to inhibit further transfers.

3. In a data-handling system with two substantially identical processors mated to operate in an interchangeable master-slave relationship, each processor including a mass memory, a working memory and a CPU linked with said memories by an internal bus enabling a transfer of data words between said memories and an exchange of such data words with external units, the combination therewith of respective interfaces in said processor communicating with each other through a bidirectional interprocessor bus, each of said interfaces comprising:

input/output means connected to said internal bus;
register means connected to said input/output means for storing, upon designation of the respective processor as the master, information received via said internal bus from the CPU thereof in regard to said data words to be transferred from the corresponding mass memory to the mass memory of the slave processor, said information including the number of said data words involved in the transfer and further including instructions to be sent to the interface of the other processor identifying memory locations destined to receive the transferred data words;

circuit means coupled to said register means to detect the stored information for extracting data words from said input/output means and for transmitting said instructions, said information, and said extracted data words to the interface of the slave processor by way of said interprocessor bus; and a buffer store enabled, upon designation of the respective processor as the slave, to receive data words transmitted by said circuit means of the interface of the master processor and to forward the received data words via the internal bus of the slave processor to the working memory thereof for subsequent retransmission to the respective mass memory under the control of the location-identifying instructions received from the register means of the master processor and stored in the register means of the interface of the slave processor;

said register means further includes an address register coupled to said input/output means for receiving an initial address of the respective working memory forming contents of said address register to which a first data word in a series of such data words is to be read out from the respective mass memory, a word counter coupled to said input/output means for receiving from the master processor a numerical value representing the number of said data words in a series to be read out, said circuit means being connected to said word counter further comprising a means for decrementing said numerical value upon the transfer of each data word and being able to detect a zero content signal from said word counter to inhibit further transfer;

each interface further including comparison means with inputs connected to said address register and to said input/output means said comparison means generated enabling signal to said circuit means, enabling the transfer of an incoming data word to said interprocessor bus in response to detection of a match between said contents of said address register and a memory address concurrently emitted by the respective CPU on the internal bus of the respective processor upon designation thereof as the master, said circuit means being connected to said address register for incrementing the contents thereof in response to said enabling signal; and said circuit means comprises a preprogrammed first sequencer coupled to said buffer store coupled to a first read-only memory means, coupled to said word counter, and coupled to said register means controlling said first read-only memory for exchanging, in response to an operating instruction from the CPU of the respective processor, preliminary signals with the interface of the other processor and a preprogrammed second sequencer coupled to a second read-only memory, coupled to said address register coupled to said internal bus and coupled to said first read only memory means controlling said second read-only memory for commanding the transfer of said data words to said other processor upon reception of a readiness signal therefrom.

4. The combination defined in claim 3 wherein each interface further comprises enabling means including an additional read-only memory, said enabling means activates said first sequencer in response to an initial instruction from the respective CPU.

5. The combination defined in claim 4 wherein said enabling means further includes decoding means said decoding means being coupled to said first read-only memory means and coupled to said input/output means for addressing said additional read-only memory in response to said initial instruction and said location-identifying instructions, said register means further including a command register with an input connected to said additional read-only memory.

6. The combination defined in claim 4 wherein each interface further includes a status register, contents of said status register are updated by at least one of said read-only memories and said status register is coupled to said respective CPU via said input/output means wherein said contents of said status register contain status of a data transfer operation, and said CPU determines said status by reading said status register.

7. The combination defined in claim 6 wherein each interface further includes an interruption-request generator responsive to signals arriving via said interprocessor bus and to commands from said first read-only memory for notifying the associated CPU of events calling for an inspection of said status register.

8. The combination defined in claim 7 wherein said circuit means further includes monitoring means coupled to said first sequencer and said status register, for detecting abnormality signals from other interface elements for establishing an alarm condition in said status register and for triggering said said first sequencer into emission by said first read-only memory of a signal activating said interuption-request generator.

9. The combination defined in claim 8 wherein said circuit means further includes timing means coupled to said monitoring means for detecting operational signals from the associated internal bus for reporting an abnormality condition to said monitoring means upon detection of an excessive duration in performing any step in a data-transfer operation.

10. The combination defined in claim 3 wherein each interface further comprises an outgoing-word register with an output connected to said interprocessor bus and an incoming-word register with an input connected to said interprocessor bus, said outgoing-word register being connected to said input/output means by way of an outgoing signal path including a correction-code generator for supplementing an outgoing word with redundancy bits, said incoming-word register being connected to said input/output means by way of an incoming signal path including said buffer store in cascade with a code corrector upon detection of said redundancy bits.

11. The combination defined in claim 10 wherein said code corrector lies upstream of said buffer store in said incoming signal path and is provided with an output line bypassing said buffer store, said output line including a normally closed electronic gate coupled to said internal bus, controlled by signals from the respective CPU to pass instruction words arriving from the other processor via said interprocessor bus when said respective CPU responds to said interruption-request generator.

12. The combination defined in claim 11 wherein each interface further includes decoding means connected to said code corrector and to said circuit means for comparing an incoming instruction word with a reference word emitted by said first read-only memory under the control of said first sequencer.

13. The combination defined in claim 10 wherein said outgoing signal path further includes an output register upstream of said correction-code generator said output register receives data from said second read-only memory under the control of said second sequencer.

14. In a data-handling system with first and second processors which are substantially identical with said first processor operated in a master function referred to as a master processor, said second processor operated in a slave function referred to as a slave processor, said second processor being an active standby ready to replace said first processor as said master processor upon cessation of operation of said first processor, whereupon said first processor becomes said slave processor, each processor including a mass memory, a working memory each of said memories contain data words and a CPU linked with said memories by an internal bus enabling a transfer of such data words between said memories and an exchange of such data words with external units, the combination therewith of a first interface of said master processor and herein referred to as said master interface and a second interface of said slave processor, herein referred to as said slave interface, communicating with each other through a bidirectional interprocessor bus, each of said interfaces comprising:

input/output means connected to said internal bus;

register means connected to said input/output means for storing, when said register means is corresponding to said master processor, information received via said internal bus from said CPU of said master processor thereof in regard to said data words to be transferred from the respective mass memory of said master process to the mass memory of said slave processor, said information including the number of said data words involved in the transfer and further including instructions to be sent to the interface of the other processor for identifying memory locations destined to receive the transferred data words;

circuit means coupled to said register means to detect the stored information for extracting data words from said input/output means and for transmitting said instructions, said information and the extracted data words to the interface of the slave processor by way of said interprocessor bus;

a buffer store enabled, when said buffer is corresponding to said slave processor, to receive data words transmitted by said circuit means of the interface of said master processor and to forward the received data words via the internal bus of the slave processor to the working memory thereof for subsequent retransmission to the respective mass memory under the control of the location-identifying instructions received from the register means of the master processor and stored in the register means of the interface of the slave processor;

said registered means includes an address register coupled to said input/output means for receiving an initial address of the associated working memory contents of said address register to which a first data word in a series of such data words is to be read out from the respective mass memory;

said register means further includes a word counter coupled to said input/output means for receiving from said master processor a numerical value representing number of said data words in a series to be read out, said circuit means being connected to said word counter further comprising a means for decrementing said numerical value upon the transfer of each data word and being able to detect a zero-content signal from said word counter to inhibit further transfers;

said circuit means comprises a preprogrammed first sequencer coupled to said buffer store, coupled to a first read only memory means, coupled to said word counter, and coupled to said register means, controlling said first read-only memory for exchanging, in response to an operating instruction from the CPU of the respective processor, preliminary signals with the interface of the other processor and a preprogrammed second sequencer coupled to a second read-only memory, coupled to said address register, coupled to said internal bus, and coupled to said first read only memory means, controlling said second read-only memory for commanding transferring said data words to said other processor upon reception of a readiness signal therefrom, comparison means with inputs connected to said address register and to said input/output means said comparison means generates an enabling signal to said circuit means enabling the transfer of an incoming data word to said interprocessor bus in response to detection of a match between said contents of said address register and a memory address concurrently emitted by the respective CPU on the internal bus of the respective processor upon designation thereof as the master, said circuit means being connected to said address register for incrementing the contents thereof in response to said enabling signal;

enabling means including an additional read-only memory, said enabling means activates said first sequencer in response to an initial instruction from the respective CPU;

status register, whereby contents of said status register are updated by at least one of said read-only memories, said status register being coupled to said associated CPU via said input/output means, wherein contents of status register contain status of a data transfer operation and said CPU determines said status by reading said status register;

an interruption-request generator responsive to signals arriving via said interprocessor bus and to commands from said first read-only memory for notifying the respective CPU of events calling for an inspection of said status register; and said circuit means further includes monitoring means coupled to said first sequencer, and to said status register for detecting abnormality signals from other interface elements for establishing an alarm condition in said status register and for triggering said first sequencer into emission by said first read-only memory of a signal activating said interruption-request generator.

15. The combination defined in claim 14 wherein said enabling means further includes decoding means, said decoding means coupled to said first read-only memory means and coupled to said input/output means for addressing said additional read-only memory in response to said initial instruction and said location-identifying instructions, said register means further including a command register with an input connected to said additional read-only memory.

16. The combination defined in claim 14 wherein said circuit means further includes timing means coupled to said monitoring means for detecting operational signals from the respective internal bus for reporting an abnormality condition to said monitoring means upon detection of an excessive duration in performing any step in a data-transfer operation.

17. The combination defined in claim 14 wherein each interface further comprises an outgoing-word register with an output connected to said interprocessor bus and an incoming-word register with an input connected to said interprocessor bus, said outgoing-word register being connected to said input/output means by way of an outgoing signal path including a correction-code generator for supplementing an outgoing word with redundancy bits, said incoming-word register being connected to said input/output means by way of an incoming signal path including said buffer store in cascade with a code corrector upon detection of said redundancy bits.

18. The combination defined in claim 17 wherein said code corrector lies upstream of said buffer store in said incoming signal path and is provided with an output line bypassing said buffer store, said output line including a normally closed electronic gate coupled to said internal bus controlled by signals from the respective CPU to pass instruction words arriving from the other processor via said interprocessor bus, when said respective CPU responds to said interruption-request generator.

19. The combination defined in claim 17 wherein said outgoing signal path further includes an output register upstream of said correction-code generator said output register receives data from said second read-only memory under the control of said second sequencer.

20. In a data-handling system with first and second processors which are substantially identical with said first processor operated in a master function referred to as a master processor, said second processor operated in a slave function referred to as a slave processor, said second processor being an active standby ready to replace said first processor as said master processor upon cessation of operation of said first processor, whereupon said first processor becomes said slave processor, each processor including a mass memory, a working memory each of said memories contain data words and a CPU linked with said memories by an internal bus enabling a transfer of such data words between said memories and an exchange of such data words with external units, the combination therewith of a first interface of said master processor and herein referred to as said master interface and a second interface of said slave processor, herein referred to as said slave interface, communicating with each other through a bidirectional interprocessor bus, each of said interfaces comprising:

input/output means connected to said internal bus;

register means connected to said input/output means for storing, when said register means is corresponding to said master processor, information received via said internal bus from said CPU of said master processor thereof in regard to said data words to be transferred from respective mass memory of said master process to the mass memory of said slave processor, said information including the number of said data words involved in the transfer and further including instructions to be sent to the interface of the other processor for indentifying memory locations destined to receive the transferred data words;

circuit means coupled to said register means to detect the stored information for extracting data words from said input/output means and for transmitting said instructions, said information and the extracted data words to the interface of the slave processor by way of said interprocessor bus;

a buffer store enabled, when said buffer corresponding to said slave processor, to receive data words transmitted by said circuit means of the interface of said master processor and to forward the received data words via the internal bus of the slave processor to the working memory thereof for subsequent retransmission to the associated mass memory under the control of the location-identifying instructions received from the register means of the master processor and stored in the register means of the interface of the slave processor;

said registered means includes an address register coupled to said input/output means for receiving an initial address of the associated working memory contents of said address register to which a first data word in a series of such data words is to be read out from respective mass memory;

said register means further includes a word counter coupled to said input/output means for receiving from said master processor a numerical value representing number of said data words in a series to be read out, said circuit means being connected to said word counter further comprising a means for decrementing said numerical value upon the transfer of each data word and being able to detect a zero-content signal from said word counter to inhibit further transfers;

said circuit means comprises a preprogrammed first sequencer coupled to said buffer store, coupled to a first read only memory means, coupled to said word counter, and coupled to said register means, controlling said first read-only memory for exchanging, in response to an operating instruction from the CPU of the respective processor, preliminary signals with the interface of the other processor and a preprogrammed second sequencer coupled to a second read-only memory, coupled to said address register, coupled to said internal bus, and coupled to said first read only memory means, controlling said second read-only memory for commanding transferring said data words to said other processor upon reception of a readiness signal therefrom, comparison means with inputs connected to said address register and to said input/output means said comparison means generates an enabling signal to said circuit means enabling the transfer of an incoming data word to said interprocessor bus in response to detection of a match between said contents of said address register and a memory address concurrently emitted by respective CPU on the internal bus of the respective processor upon designation thereof as the master, said circuit means being connected to said address register for incrementing the contents thereof in response to said enabling signal;

enabling means including an additional read-only memory, said enabling means activates said first sequencer in resposne to an initial instruction from the respective CPU;

status register, whereby contents of said status register are updated by at least one of said read-only memories, said status register being coupled to said associated CPU via said input/output means, wherein contents of status register contain status of a data transfer operation and said CPU determines said status by reading said status register;

an interruption-request generator responsive to signals arriving via said interprocessor bus and to commands from said first read-only memory for notifying the respective CPU of events calling for an inspection of said status register; and said circuit means further includes monitoring means coupled to said first sequencer, and to said status register for detecting abnormality signals from other interface elements for establishing an alarm condition in said status register and for triggering said first sequencer into emission by said first read-only memory of a signal activating said interruption-request generator, and timing means coupled to said monitoring means for detecting operational signals from the respective internal bus for reporting an abnormality condition to said monitoring means upon detection of an excessive duration in performing any step in a data-transfer operation.

* * * * *